(12) United States Patent
Uchida et al.

(10) Patent No.: US 7,672,292 B2
(45) Date of Patent: Mar. 2, 2010

(54) MOBILE PACKET COMMUNICATION SYSTEM

(75) Inventors: Shigeru Uchida, Tokyo (JP); Akira Ootsuka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 744 days.

(21) Appl. No.: 11/596,669

(22) PCT Filed: May 21, 2004

(86) PCT No.: PCT/JP2004/007324

§ 371 (c)(1),
(2), (4) Date: Nov. 16, 2006

(87) PCT Pub. No.: WO2005/115041

PCT Pub. Date: Jan. 12, 2005

(65) Prior Publication Data

US 2007/0242640 A1 Oct. 18, 2007

(51) Int. Cl.
H04J 3/06 (2006.01)
(52) U.S. Cl. .............. 370/350; 370/335; 370/329; 455/450
(58) Field of Classification Search .......... 370/350, 370/335, 328; 455/450
See application file for complete search history.

(56) References Cited

U.S. PATENT DOCUMENTS 5,982,780 A * 11/1999 Bohm et al. ............ 370/450
7,146,167 B2 * 12/2006 Tanabe ..................... 455/436
7,227,860 B2 * 6/2007 Isoyama et al. ........... 370/386
7,319,885 B2 * 1/2008 Mukai et al. ............ 455/550.1
7,339,948 B2 * 3/2008 Balasubramanian et al. 370/458
2003/0124983 A1 * 7/2003 Parssinen et al. ........... 455/69

FOREIGN PATENT DOCUMENTS

| EP | 0332345 A2 | 9/1989 |
| EP | 1 209 940 A1 | 5/2002 |
| JP | 2001-223716 A | 8/2001 |
| JP | 2002-204257 A | 7/2002 |
| JP | 2003-273922 A | 9/2003 |
| WO | WO-02/075986 A1 | 9/2002 |

OTHER PUBLICATIONS

3GPP TR 25.896 Sec 7.1.1 Sec 7.1.2 Sec 7.1.4, Dec. 2003, pp. 15-24.

* cited by examiner

*Primary Examiner*—Danh C Le
(74) *Attorney, Agent, or Firm*—Birch, Stewart, Kolasch & Birch, LLP

(57) ABSTRACT

A radio base station allocates, when performing a real-time Internet-protocol data communication, up-link radio resources, based on basic information of transmission data, so that the transmission data is transmitted in synchronization with a codec cycle of a mobile communication terminal in a concentrated manner, and notifies a result of allocating the up-link radio resources to the mobile communication terminal as an up-transmission schedule. A mobile communication terminal controls transmission of a radio frame based on the up-transmission schedule.

9 Claims, 12 Drawing Sheets

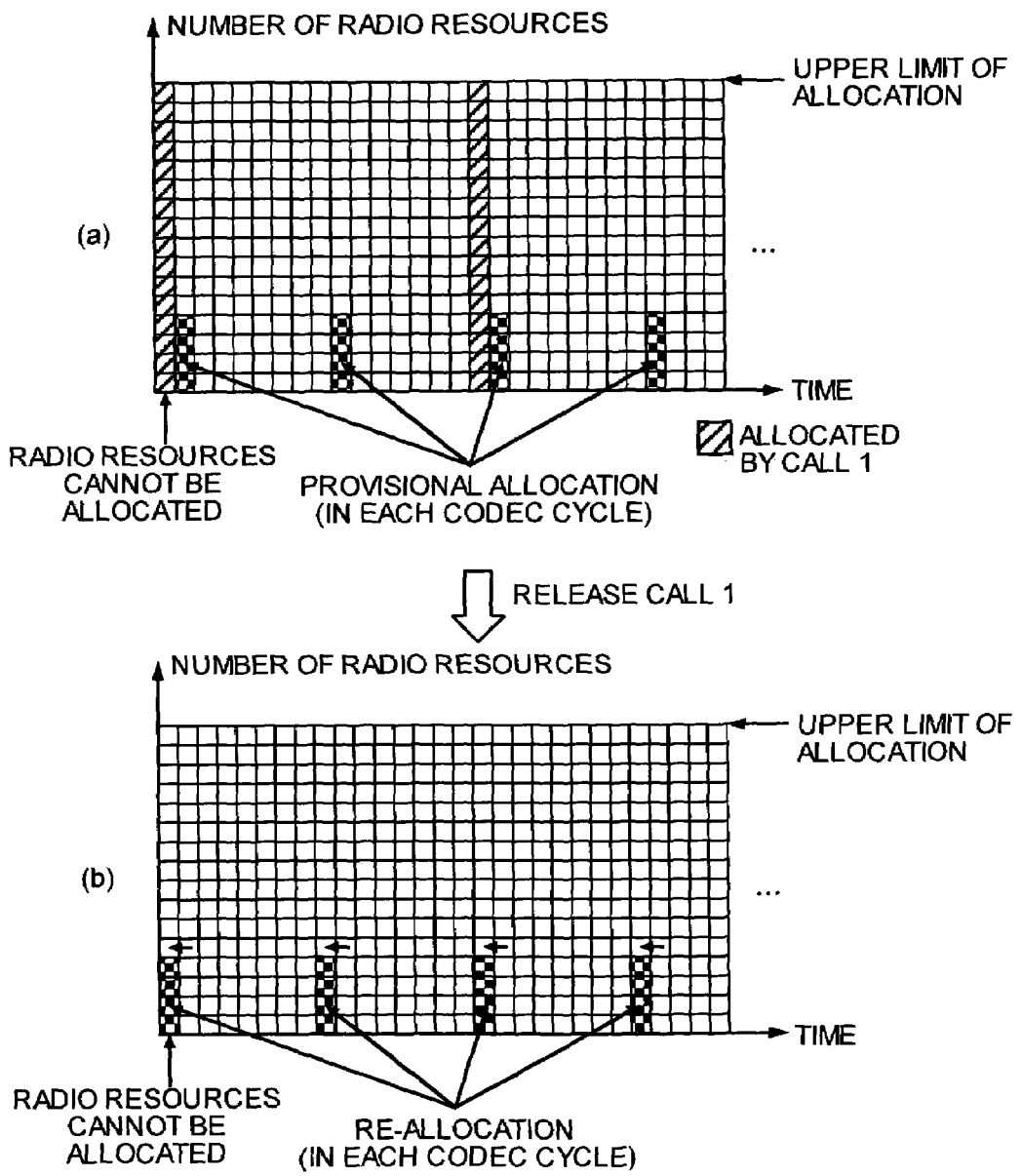

MOBILE PACKET COMMUNICATION SYSTEM

TECHNICAL FIELD

The present invention relates to a mobile packet communication system that employs a radio access scheme such as CDMA and OFDMA, and more particularly, to a scheduling that helps to improve following capability of transmission processing with respect to data required to be processed in real-time.

BACKGROUND ART

At present, studies are underway to provide Internet Protocol (IP) for all mobile communication systems. In such a system, it is expected that real-time data required to be processed in real-time, such as audio data and video data, will be IP-packetized, which can increase a transfer delay between two terminals for transmission and reception, depending on a routing path to be used. It is desirable to reduce the delay in a radio access as much as possible.

Conventionally, a method in which real-time data and burst data are mixed and subjected to dynamic band-allocation (scheduling) is proposed, in contrast to a time-division radio access scheme. According to this method, priorities are imparted to each of CBR/VBR/ABR classes according to an estimated transmission-completion time (time obtained by adding cycle time to transmission time) and an amount of data to be received before the estimated transmission-completion time. Bands are then allocated in preferential order from transfer data with higher priority (see Patent Document 1).

Patent Document 1: Japanese Patent Application Laid-Open No. 2001-223716

However, in the conventional scheduling method, the priority is calculated from the time based on the cycle time of each service and the amount of reception data, and a service with strict requirements regarding delay will not be preferentially processed. Therefore, the service can be delayed by the cycle time or can fluctuate. In the scheduling method, the estimated transmission-completion time is determined based on reference time adopted in a parent station. Hence, the estimated transmission-completion time is not synchronized with the time when a request is made for data transmission, which can cause a delay.

The present invention has been achieved to solve the above problems, and an object of the present invention is to provide a mobile packet communication system in which real-time IP data required to be handled in real-time is transmitted from a mobile communication terminal via a radio transmission path, at the codec timing of the mobile communication terminal in an up-transmission from the mobile communication terminal, thereby minimizing the delay resulting from a radio access and reducing transfer delay between transmission and reception terminals.

DISCLOSURE OF INVENTION

A mobile packet communication system according to one aspect of the present invention includes a radio base station that allocates, when performing a real-time Internet-protocol data communication, up-link radio resources, based on basic information of transmission data, so that the transmission data is transmitted in synchronization with a codec cycle of a mobile communication terminal in a concentrated manner, and notifies a result of allocating the up-link radio resources to the mobile communication terminal as an up-transmission schedule; and a mobile communication terminal that controls transmission of a radio frame based on the up-transmission schedule. Therefore, the mobile communication terminal transmits real-time IP data to the radio transmission path in an up-direction at the codec timing of the mobile communication terminal. This reduces the delay resulting from a radio access and decreases the transfer delay between the transmission and reception terminals.

Furthermore, the basic information of the transmission data includes codec start-time information determined by the mobile communication terminal, and the up-transmission schedule created by the radio base station includes a codec start-timing of the mobile communication terminal. That is, the mobile communication terminal determines a codec start reference time, and transmits transmission-data basic information including codec start-time information which includes the reference time, to the radio base station. The radio base station generates an up-transmission schedule taking into consideration the codec start-time information, at the time of scheduling. The mobile communication terminal controls the transmission of radio frames based on the up-transmission schedule. Thus, the mobile communication terminal dominantly determines the codec start-time, thereby stabilizing session-start timing.

Alternatively, there is a method in which the mobile communication terminal determines the codec start-timing based on the up-transmission schedule transmitted from the radio base station. That is, instead of including information on the codec start-time in the transmission-data basic information transmitted from the mobile communication terminal to the radio base station, the mobile communication terminal determines the codec start-timing based on the up-transmission schedule prepared by the radio base station. Thus, the radio base station dominantly determines the codec start-time of the mobile communication terminal, thereby further reducing delay due to a radio access.

Moreover, the mobile communication terminal determines a codec start-timing based on the up-transmission schedule. Therefore, the up-transmission schedule is prepared by taking into consideration data with different configuration depending on the service content. As a result, the codec start-time can be determined more accurately, thereby realizing a highly reliable transmission operation.

BRIEF DESCRIPTION OF DRAWINGS

FIGS. 12(a) and 12(b) are graphs of a state of reallocation from tentatively allocated radio resources to radio resources initially scheduled to be allocated.

BEST MODE(S) FOR CARRYING OUT THE INVENTION

Exemplary embodiments of a mobile packet communication system according to the present invention will be explained in detail below with reference to the drawings. The present invention is not limited to the embodiments.

First Embodiment

Figure 1:
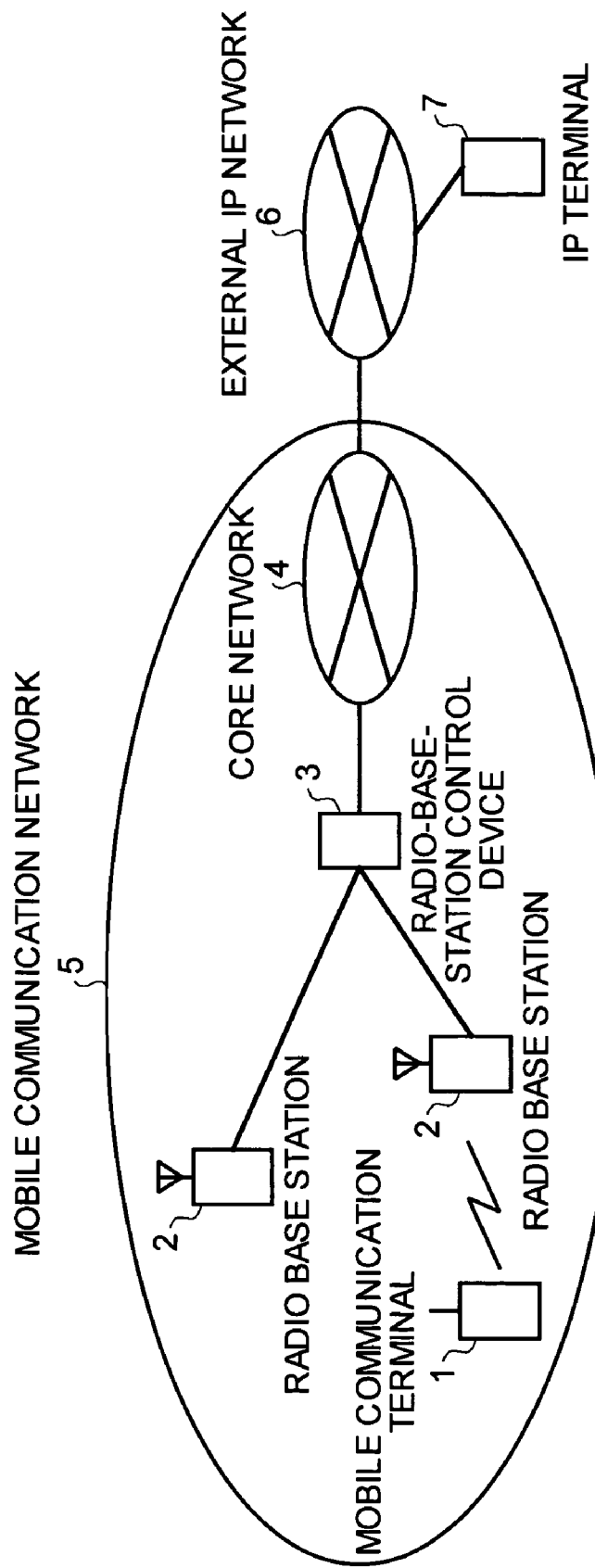
FIG. 1 is a distribution diagram of a configuration of a mobile packet communication system according to the present invention.

FIG. 1 is a distribution diagram of a configuration of a mobile packet communication system according to the present invention. As shown in FIG. 1, a mobile communication terminal 1, a radio base station 2, a radio-base-station control device 3, and a core network 4 constitute a mobile communication network 5. The mobile communication network 5 is connected to an external IP network 6, to which an IP terminal 7 is connected. Assume that the present embodiment employs the code division multiple access (CDMA) as a radio access scheme. However, the present invention is not limited to an application to the CDMA, but it can be considered that the present invention is applied to an orthogonal frequency division multiple access (OFDMA) in a similar manner.

Figure 2:
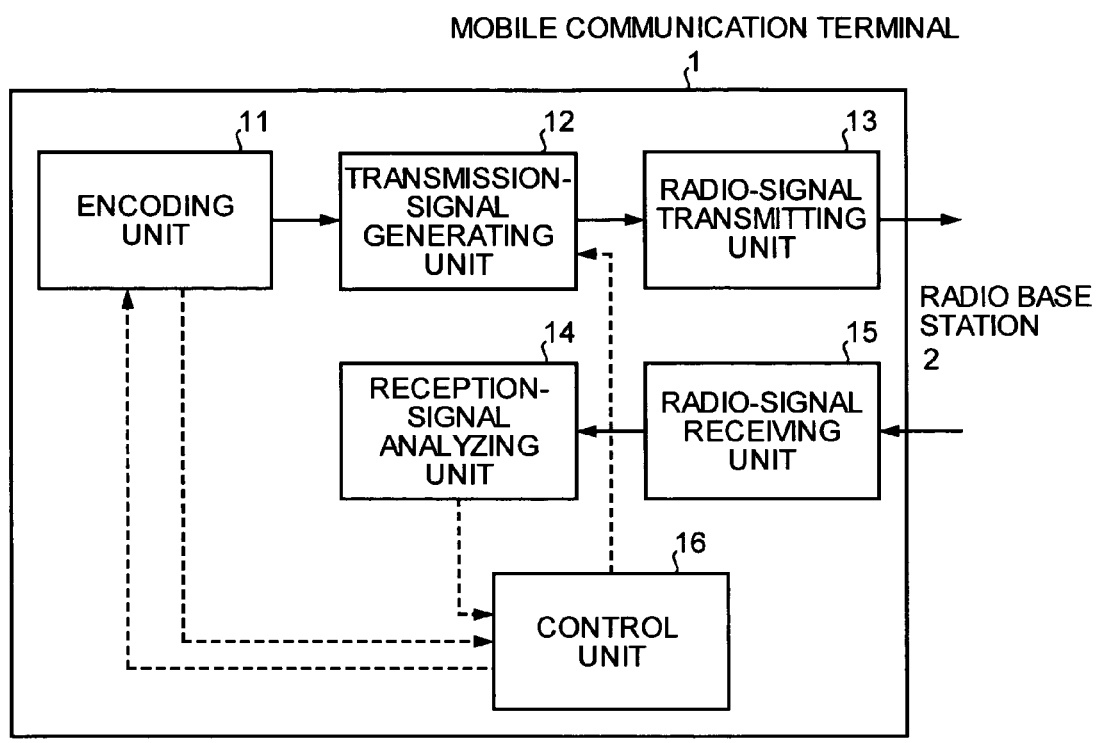
FIG. 2 is a functional block diagram of parts that prepare an up-transmission schedule in the mobile communication terminal.

FIG. 2 is a functional block diagram of parts that prepare an up-transmission schedule in the mobile communication terminal 1. As shown in FIG. 2, the mobile communication terminal 1 includes an encoding unit 11, a transmission-signal generating unit 12, a radio-signal transmitting unit 13, a reception-signal analyzing unit 14, a radio-signal receiving unit 15, and a control unit 16. In the mobile communication terminal 1, the transmission-signal generating unit 12 superposes transmission data encoded by the encoding unit 11, on a predetermined radio-channel control signal to generate a transmission signal. The transmission signal is transmitted from the radio-signal transmitting unit 13. A radio-signal receiving unit 15 receives a reception signal, which is analyzed by the reception-signal analyzing unit 14. The control unit 16 controls these operations.

Figure 3:
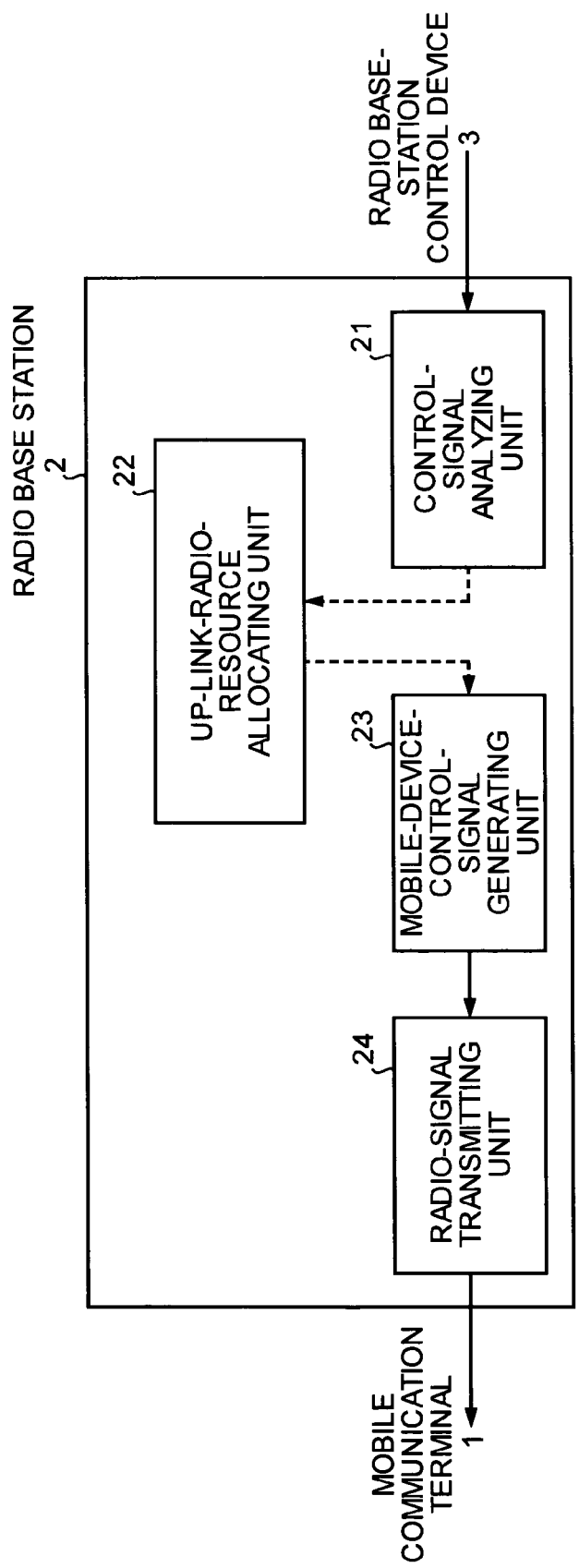
FIG. 3 is a functional block diagram of parts that prepare an up-transmission schedule in a radio base station.

FIG. 3 is a functional block diagram of parts that prepare the up-transmission schedule in the radio base station 2. As shown in FIG. 3, the radio base station 2 includes a control-signal analyzing unit 21, an up-link-radio-resource allocating unit 22, a mobile-device-control-signal generating unit 23, and a radio-signal transmitting unit 24. When a signal input from the radio-base-station control device 3 is a request for setting of a radio channel, the signal is sent to the up-link-radio-resource allocating unit 22. The up-link-radio-resource allocating unit 22 allocates up-link radio resources, that is, performs up-transmission scheduling. The obtained up-transmission schedule is sent to the mobile-device-control-signal generating unit 23, by which the schedule is superposed on a predetermined radio-channel control signal to generate a transmission signal. The radio-signal transmitting unit 24 transmits the transmission signal to the mobile communication terminal 1.

Operation will be explained next. An example in which a session of real-time IP data communications is performed between the mobile communication terminal 1 and the IP terminal 7 will be explained.

(1) Generation of Transmission Data Basic Information in Mobile Communication Terminal An operation from generation of up-transmission data basic information in the mobile communication terminal 1 to notification of the information to the radio-base-station control device will be explained.

When a session of real-time IP data communications is started with an input operation by an operator as a trigger, the control unit 16 (see FIG. 2) recognizes that a procedure of establishing a radio channel for the real-time IP data communications has started. The control unit 16 requests the encoding unit 11 to determine the start timing of codec. Upon receiving the codec start-timing determination request, the encoding unit 11 determines the time to be the basis of starting the codec and sends this time information to the control unit 16. The control unit 16 adds a predetermined processing time to this codec start reference time, thus calculating an up-transmission start reference time, which is sent to the transmission-signal generating unit 12. The predetermined processing time is the processing time from the codec-completion timing that is held as inherent information to transmission of a radio frame, in the mobile communication terminal 1.

The up-transmission start reference time sent to the transmission-signal generating unit 12 is superposed on a radio-channel control signal and used as a part of quality-of-service (QoS) information. The up-transmission start reference time is then transmitted from the radio-signal transmitting unit 13 to the radio-base-station control device 3 via the radio base station 2.

The up-transmission basic information can be generated in the mobile communication terminal 1 and can be notified to the radio-base-station control device 3, in the following method. That is, the control unit 16 recognizes that a procedure of establishing a radio channel has started, and requests the encoding unit 11 to determine the codec start-timing. The encoding unit 11, which has received the codec start-timing determination request, performs codec on dummy data until a radio channel is established for the real-time IP data. The encoding unit 11 sends the generated IP packet to the transmission-signal generating unit 12. The transmission-signal generating unit 12 recognizes the time at which it receives the IP packet, as the codec start reference time. The transmission-signal generating unit 12 adds a predetermined processing time to the codec start reference time, thus calculating an up-transmission start reference time. At the same time, the transmission-signal generating unit 12 discards the dummy data. The transmission-signal generating unit 12 superposes the up-transmission reference time as a part of QoS information, on a radio-channel control signal. The up-transmission start reference time is transmitted from the radio-signal transmitting unit 13 to the radio-base-station control device 3 via the radio base station 2.

(2) Radio-Channel Setting Request from the Radio-base-station Control Device 3 to the Radio Base Station 2

The radio-base-station control device 3 receives transmission reference time information from the mobile communication terminal 1. The radio-base-station control device 3 then writes, as a part of QoS information, this information, the codec cycle time for the session, communication type, and information on a maximum amount of data transmitted per codec-cycle time from the mobile communication terminal 1 in a direction (up) to the radio base station 2. The radio-base-station control device 3 then transmits a radio-channel setting request including the QoS information to the radio base station 2.

(3) Allocation of Up-Link Radio Resources in the Radio Base Station 2

A method of allocating up-link radio resources of the radio base station 2 when the radio base station 2 receives a radio-channel setting request from the radio-base-station control device 3, and a method of informing an up-link schedule to the mobile communication terminal 1 are explained.

The control-signal analyzing unit 21 (see FIG. 3), having received the radio-channel setting request from the radio-base-station control device 3, sends the QoS information to the up-link-radio-resource allocating unit 22. The up-link-radio-resource allocating unit 22 determines, from the QoS information, whether the communication type is included in the real-time IP data communications. If the communication type is included in the real-time IP data communications, the up-link-radio-resource allocating unit 22 prepares an up-transmission schedule for transmitting radio frames continuously at the codec timing of the mobile communication terminal 1.

Figure 4:
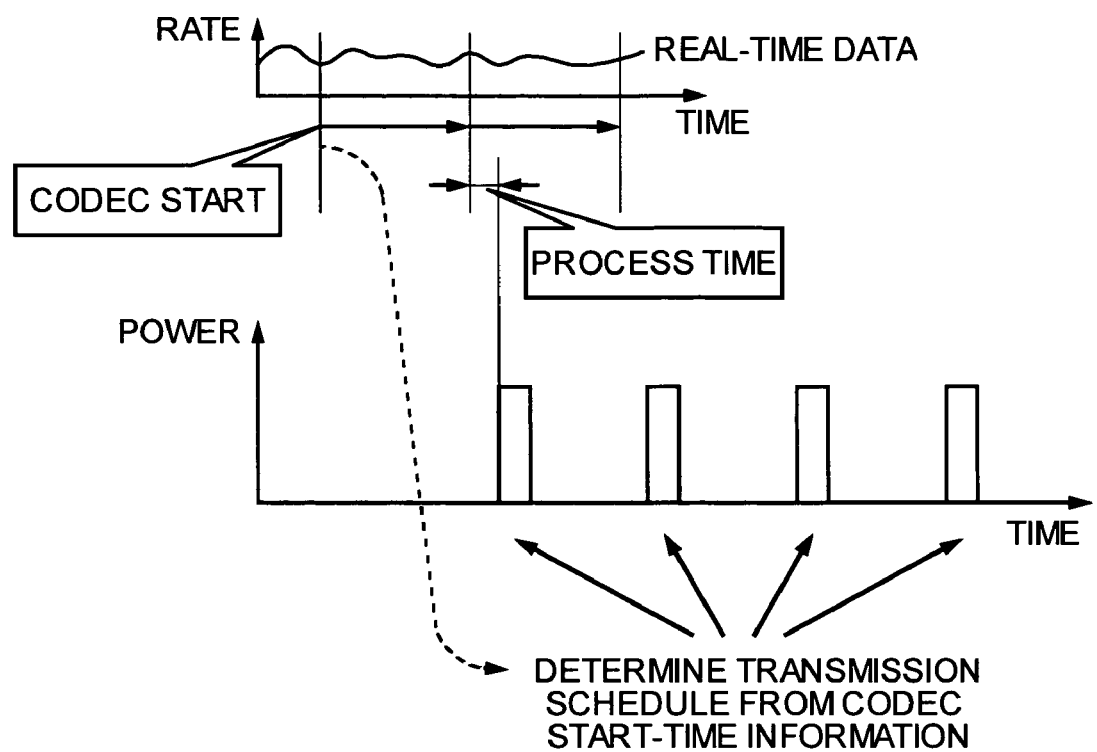
FIG. 4 is a schematic diagram for explaining a state in which the up-transmission schedule has been determined based on codec start-time information.

FIG. 4 is a schematic diagram for explaining a state in which the up-transmission schedule has been determined based on codec start-time information. As shown in FIG. 4, the up-link-radio-resource allocating unit 22 allocates radio resources based on the QoS information so that radio frames can be transmitted continuously at the codec timing of the mobile communication terminal 1. That is, the up-link-radio-resource allocating unit 22 allocates the radio resources continuously during each codec-cycle time until the call is released. An up-transmission schedule obtained by the allocation (including the time for which transmission can be performed, spreading factors, and the like) is transmitted from the mobile-device-control-signal generating unit 23 to the mobile communication terminal 1 via the radio-signal transmitting unit 24.

The radio resource allocation operation by the up-link-radio-resource allocating unit 22 will be explained in detail.

Figure 5:
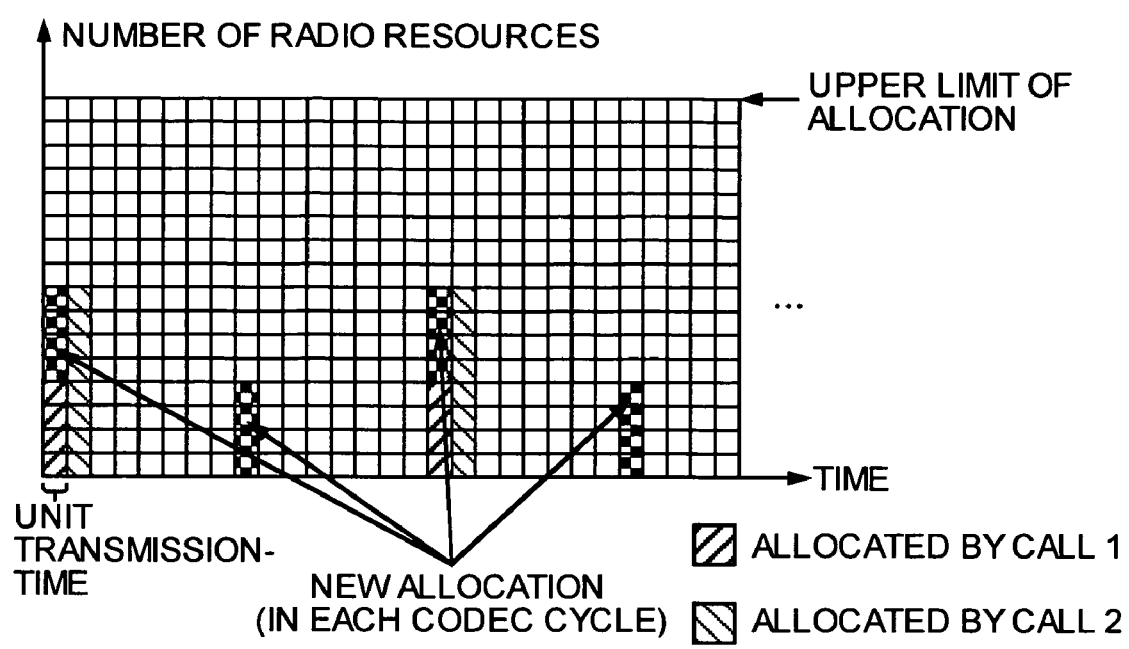
FIG. 5 is a graph of a state of radio resource allocation according to a first embodiment of the present invention.
Figure 6:
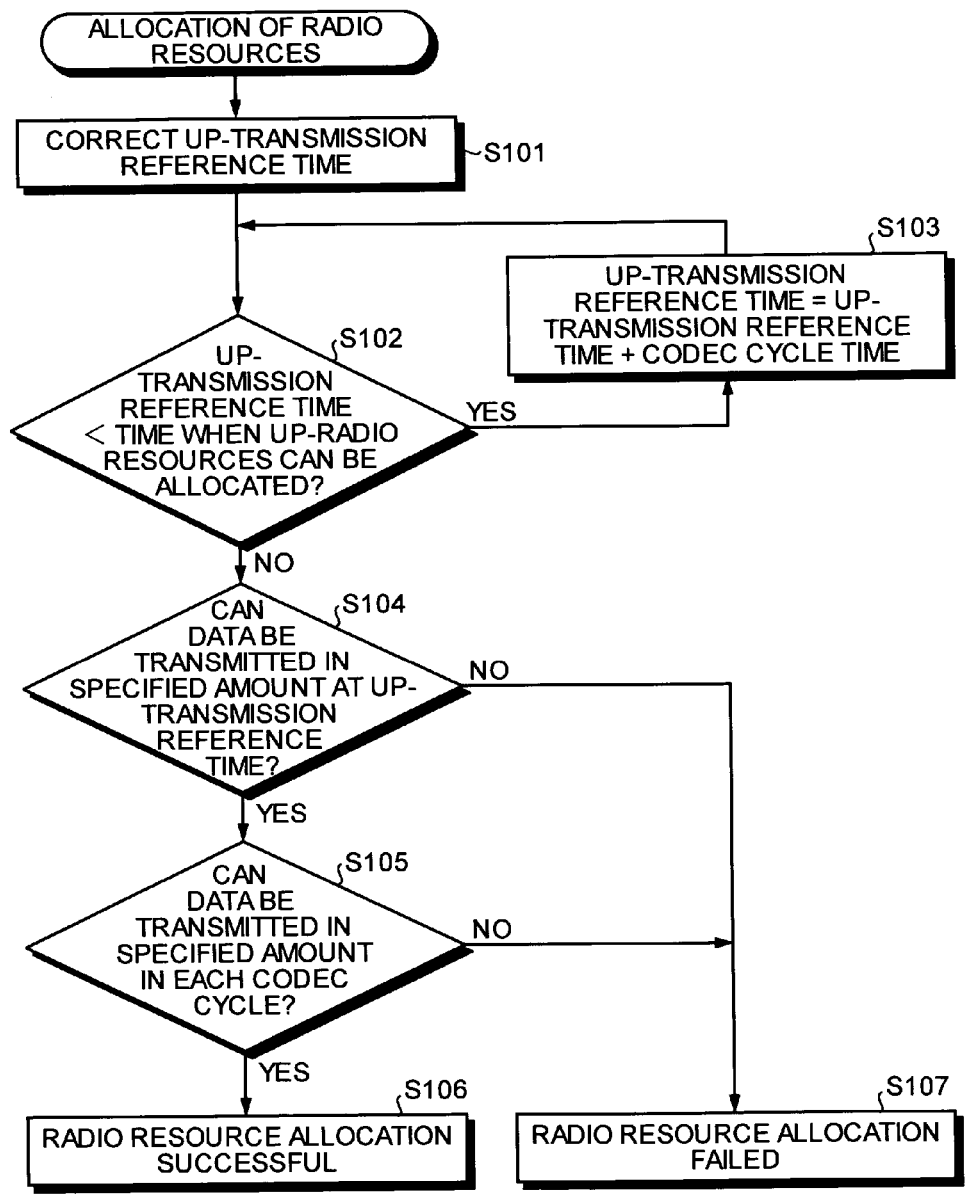
FIG. 6 is a flowchart of an operation of allocating radio resources according to the first embodiment.

FIG. 5 is a graph of radio resource allocation. The number of allocated radio resources is plotted on the ordinate, and time is plotted on the abscissa. FIG. 6 is a flowchart of the operation of allocating radio resources.

The radio base station 2 manages the allocation of radio resources during each of a unit transmission-time of the up-transmission schedule as shown in FIG. 5. When a new request is made for allocation of radio resources, the radio base station 2 corrects the up-transmission reference time based on the unit transmission-time (step 101 in FIG. 6). The condition of "up-transmission reference time valid before correction"<"up-transmission reference time valid after correction" is applied herein. To meet this condition, the codec-cycle time is repeatedly added if the transmission reference time valid before the correction is less than the time during which up-radio resources can be allocated at present in the radio base station 2, that is, if the above inequality is satisfied (namely, if "up-transmission reference time valid after correction"<"time when allocation can be performed") (steps 102 and 103 in FIG. 6).

If any radio resource that can transmit a large amount of data for one cycle time at the up-transmission reference time valid after recorrection and at a predetermined codec cycle timing is secured (limit of radio resources is determined based on a total value of interference power in the radio base station 2), the radio base station 2 allocates a spreading factor corresponding to the radio resource, indicating that the radio resources have been successfully allocated (steps 104, 105, and 106 in FIG. 6).

If no such radio resources are secured (if NO at steps 104 and 105 in FIG. 6), the radio base station 2 does not allocate radio resources, indicating that the radio resources have not been successfully allocated (step 107 in FIG. 6).

(4) Control of Up-Transmission in the Mobile Communication Terminal 1

Up-transmission control in the mobile communication terminal 1 that has received the up-transmission schedule is explained next. In the mobile communication terminal 1, the up-transmission schedule acquired through the radio-signal receiving unit 15 (see FIG. 2) and the reception-signal analyzing unit 14 is sent to the control unit 16. The control unit controls transmission of the radio-signal transmitting unit 13 according to the received transmission schedule.

When the mobile communication terminal 1 performs hand-over process to any other cell or a sector, the radio base station 2 for the cell or the sector to which data will be transmitted determines an up-transmission schedule for the mobile communication terminal 1 in the same procedure as establishing the radio channel.

Thus, in the mobile packet communication system according to this embodiment, up-link radio resources are allocated according to the transmission-data basic information so that the transmission data can be continuously transmitted at the codec cycle of the mobile communication terminal 1, thereby accomplishing real-time IP data communications. The mobile packet communication system has the radio base station 2 that informs the result of the allocation as a transmission schedule to the mobile communication terminal 1, and the mobile communication terminal 1 that controls the transmission of radio frames according to the up-transmission schedule. Therefore, the mobile communication terminal 1 transmits the real-time IP data through the radio transmission path in an up-communication direction at the codec timing of the mobile communication terminal 1. Thus, the delay resulting from a radio access is reduced, and the transfer delay between the transmission and reception terminals can be reduced.

The transmission-data basic information generated by the mobile communication terminal 1 includes the information on a codec start-time determined by the mobile communication terminal 1. The up-transmission schedule prepared by the radio base station 2 also includes the codec start-timing of the mobile communication terminal 1. That is, the mobile communication terminal 1determines the codec start reference time and transmits the transmission-data basic information including this reference time to the radio base station 2 through the radio-base-station control device 3. The radio base station 2 generates an up-transmission schedule taking into consideration the codec start-time information. Based on the up-transmission schedule thus generated, the mobile communication terminal 1 controls the transmission of radio frames. Thus, the mobile communication terminal 1 dominantly determines the codec start-time, thereby providing a timing of starting a stable session.

The radio-base-station control device 3 adds communication-parameter information representing the service content of the transmission data, to the transmission-data basic information to be transmitted to the radio base station 2. Hence, a further precise codec start-time can be obtained, thereby ensuring a highly reliable transmission operation.

Second Embodiment

Figure 7:
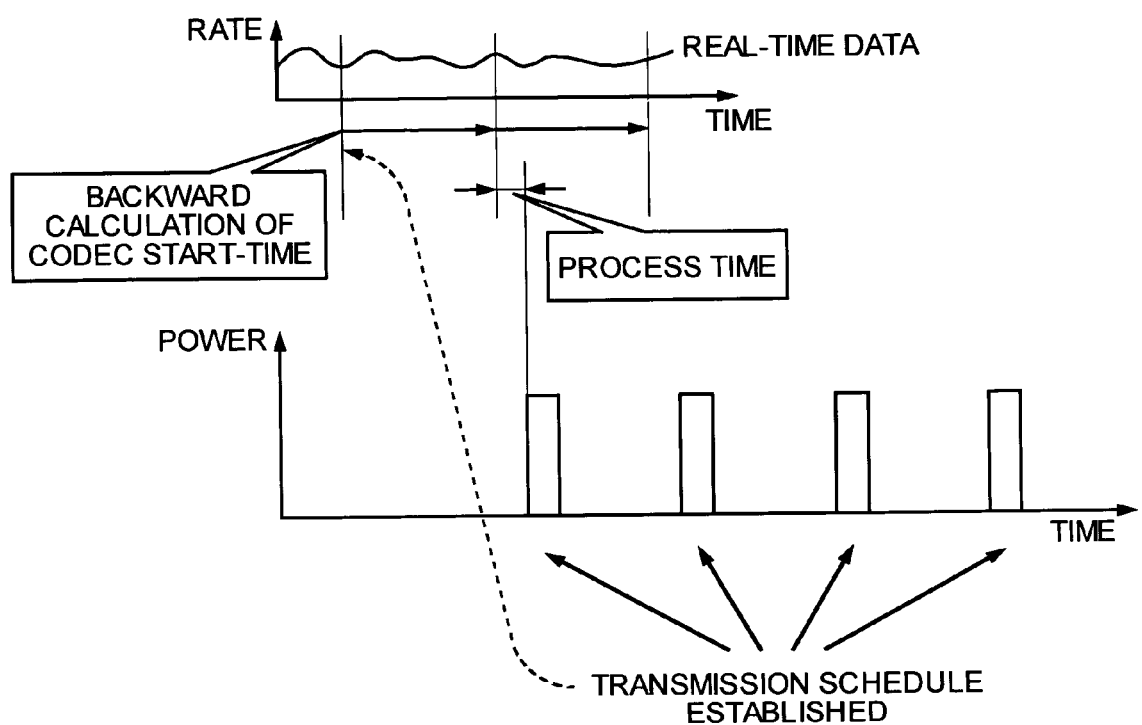
FIG. 7 is a schematic diagram for explaining determination of an up-transmission schedule from a codec start-time obtained by a backward calculation, which characterizes a mobile packet communication system according to a second embodiment of the present invention.

FIG. 7 is a schematic diagram for explaining determination of an up-transmission schedule from a codec start-time obtained by a backward calculation, which characterizes a mobile packet communication system according to a second embodiment of the present invention.

In the present embodiment, the mobile communication terminal 1 determines the codec start-timing based on the transmission schedule prepared by the radio base station 2, on the contrary to the first embodiment.

Flow of the up-transmission scheduling process by the mobile communication terminal 1, in cooperation with the radio base station 2 will be explained.

(1) Radio-Channel Setting Request from the Radio-base-station Control Device 3 to the Radio Base Station 2

To initiate a session of real-time IP data communication between, for example, the mobile communication terminal 1 and the IP terminal 7, the radio-base-station control device 3 writes, as a part of QoS information, the codec-cycle time for the session, the communication type, and information on a maximum amount of data transmitted per codec-cycle time from the mobile communication terminal 1 in a direction (up) to the radio base station 2. The radio-base-station control device 3 then transmits a radio-channel setting request including the QoS information to the radio base station 2.

(2) Allocation of Up-Link Radio Resources in the Radio Base Station 2

The control-signal analyzing unit 21 (see FIG. 3), having received the radio-channel setting request from the radio-base-station control device 3, sends the QoS information to the up-link-radio-resource allocating unit 22. The up-link-radio-resource allocating unit 22 determines, from the QoS information, whether the communication type is included in the real-time IP data communications. If the communication type is included in the real-time IP data communications, the up-link-radio-resource allocating unit 22 allocates the radio frames continuously during each codec-cycle time until the call is released. (That is, a transmission reference time at which cycles can be allocated in the radio base station 2 is determined). An up-transmission schedule is thus obtained by the allocation is transmitted to the mobile communication terminal 1 via the mobile-device-control-signal generating unit 23 and the radio-signal transmitting unit 24.

(3) Control of Up-Transmission in the Mobile Communication Terminal 1

Up-transmission control in the mobile communication terminal 1 that has received the up-transmission schedule will be explained. In the mobile communication terminal 1, the up-transmission schedule acquired through the radio-signal receiving unit 15 and the reception-signal analyzing unit 14 is sent to the control unit 13. The control unit 16 controls the encoding unit 11 according to the up-transmission schedule, so that the encoding unit 11 shifts the codec start-timing taking into consideration the process time between a codec-completion timing and a radio-frame transmission, to minimize the delay between the codec completion and the transmission of radio signals. Thereafter, the control unit controls the transmission of the radio-signal transmitting unit 13.

Figure 8:
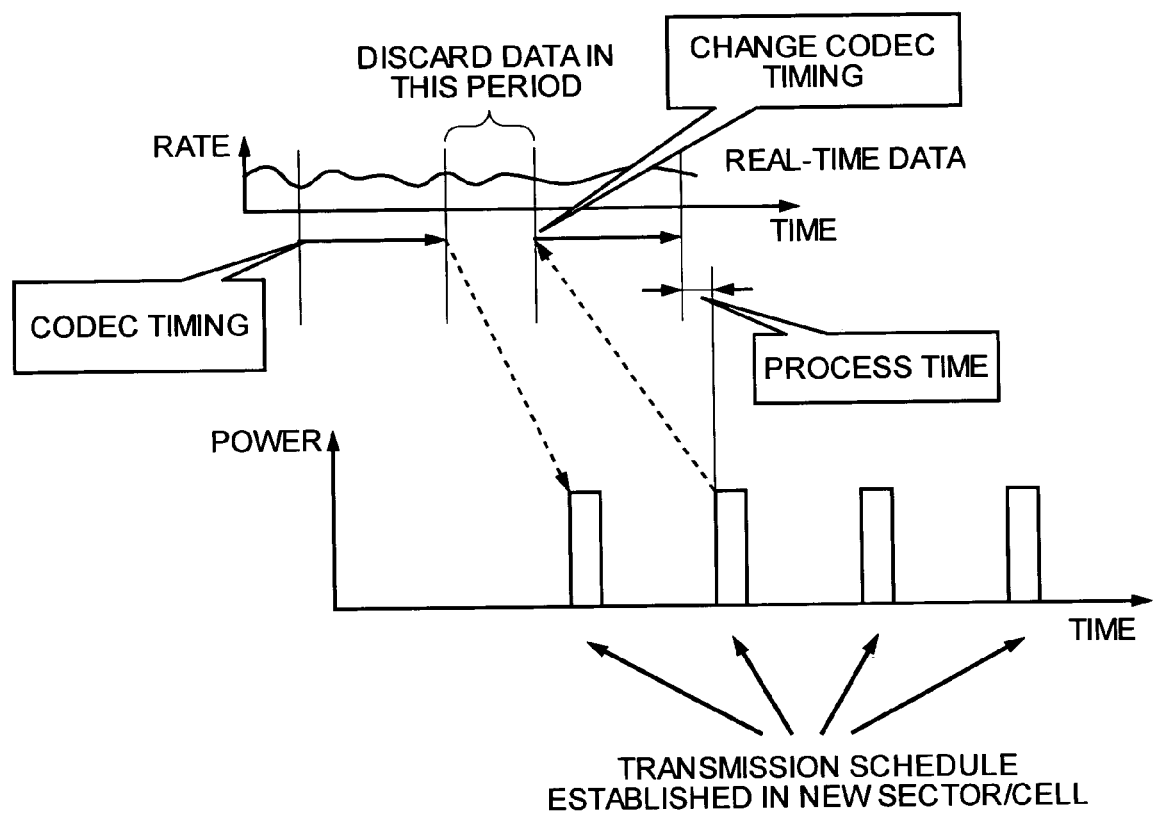
FIG. 8 is an explanatory diagram of the up-transmission schedule at the time of a hand-over.

FIG. 8 is an explanatory diagram of the up-transmission schedule at the time of a hand-over process. When the mobile communication terminal 1 performs a hand-over process to any other cell or a sector, the radio base station 2 for the cell or the sector to which data will be transmitted determines an up-transmission schedule for the mobile communication terminal 1 in the same procedure as establishing the radio channel. At this time, the codec start-timing is changed as shown in FIG. 8. Hence, the data under encoding is discarded.

Thus, the mobile communication terminal 1 determines the codec start-timing from the up-transmission schedule in the mobile packet communication system according this embodiment. That is, the transmission-data basic information prepared by the mobile communication terminal 1 does not include information about the start of the codec. The mobile communication terminal 1 determines the codec start-timing based on the up-transmission schedule prepared by the radio base station 2. Thus, the radio base station 2 dominantly determines the codec start-time, thereby further reducing the delay resulting from a radio access.

At the time of the hand-over process, the radio base station 2 of the cell or the sector to which data is transmitted, prepares an up-transmission schedule in the same procedure as described above. Hence, the delay resulting from a radio access can be reduced, also for the up-transmission of real-time IP data during the hand-over process.

Third Embodiment

Figure 9:
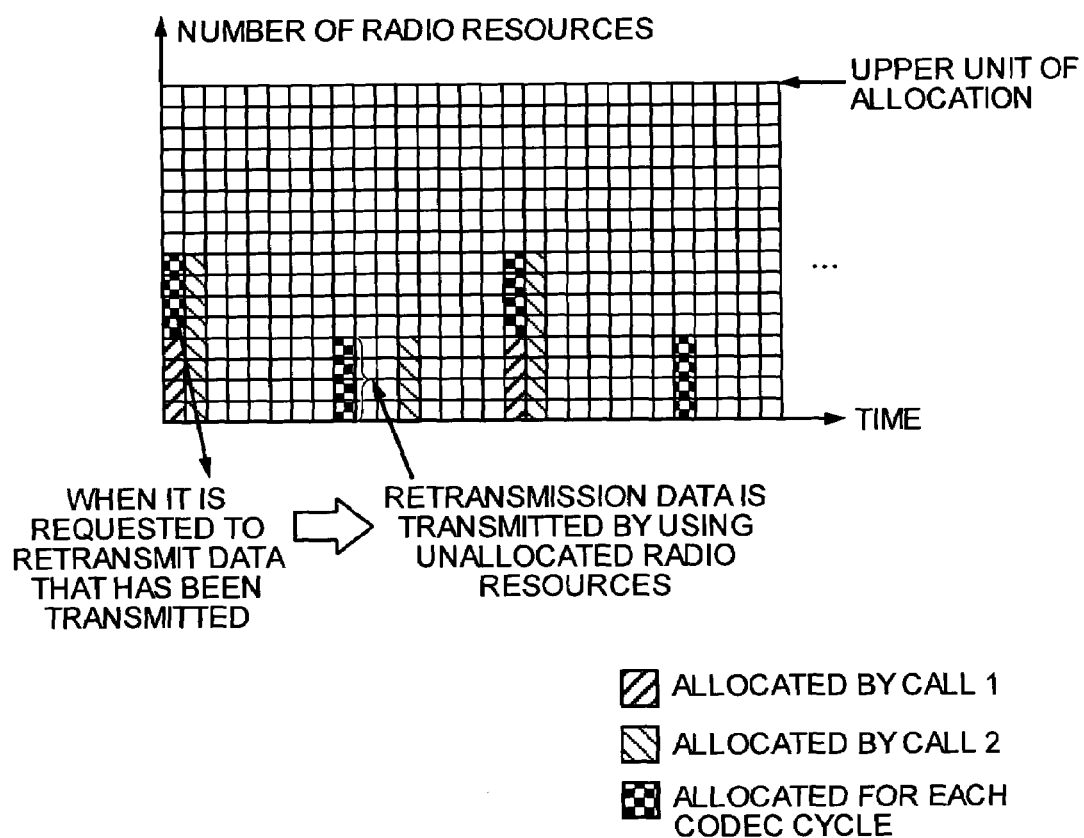
FIG. 9 is a graph of information relating to radio resource allocation, which characterizes a mobile packet communication system according to a third embodiment of the present invention.

FIG. 9 is a graph of information relating to radio resource allocation, which characterizes a mobile packet communication system according to a third embodiment of the present invention. The present embodiment is characterized by an operation that is performed when a request for retransmission of data is received. When the mobile communication terminal 1 receives the request for retransmission of data from the radio-base-station control device 3 or the radio base station 2, this retransmission request is transmitted to the control unit 16 through the radio-signal receiving unit 15 (see FIG. 2) and the reception-signal analyzing unit 14.

As shown in FIG. 9, the control unit 16 uses the radio resources of best-effort data, not the real-time data, to control the transmission-signal generating unit 12 and the radio-signal transmitting unit 13, to transmit retransmission data according to the radio resource allocating scheme for best effort (a scheme of determining the timing of transmitting any radio resource not allocated to real-time data from, for example, a random variable).

As shown in FIG. 9, the control unit 13 uses the radio resources of best-effort data, not the real-time data, to control the transmission-signal generating unit 12 and the radio-signal transmitting unit 14, to transmit retransmission data according to the radio resource allocating scheme for best effort (a scheme of determining the timing of transmitting any radio resource not allocated to real-time data from, for example, a random variable).

Thus, in the mobile packet communication system according to this embodiment, the mobile communication terminal 1 performs transmission by using the radio resources allocated to each codec cycle, to establish ordinary real-time IP data communications. To transmit the same data again, the mobile communication terminal 1 uses the radio resources allocated for best-effort. The radio resource allocating scheme for best effort can prevent a delay in cyclic transmission of the packets due to retransmission of the packets.

Fourth Embodiment

Figure 10:
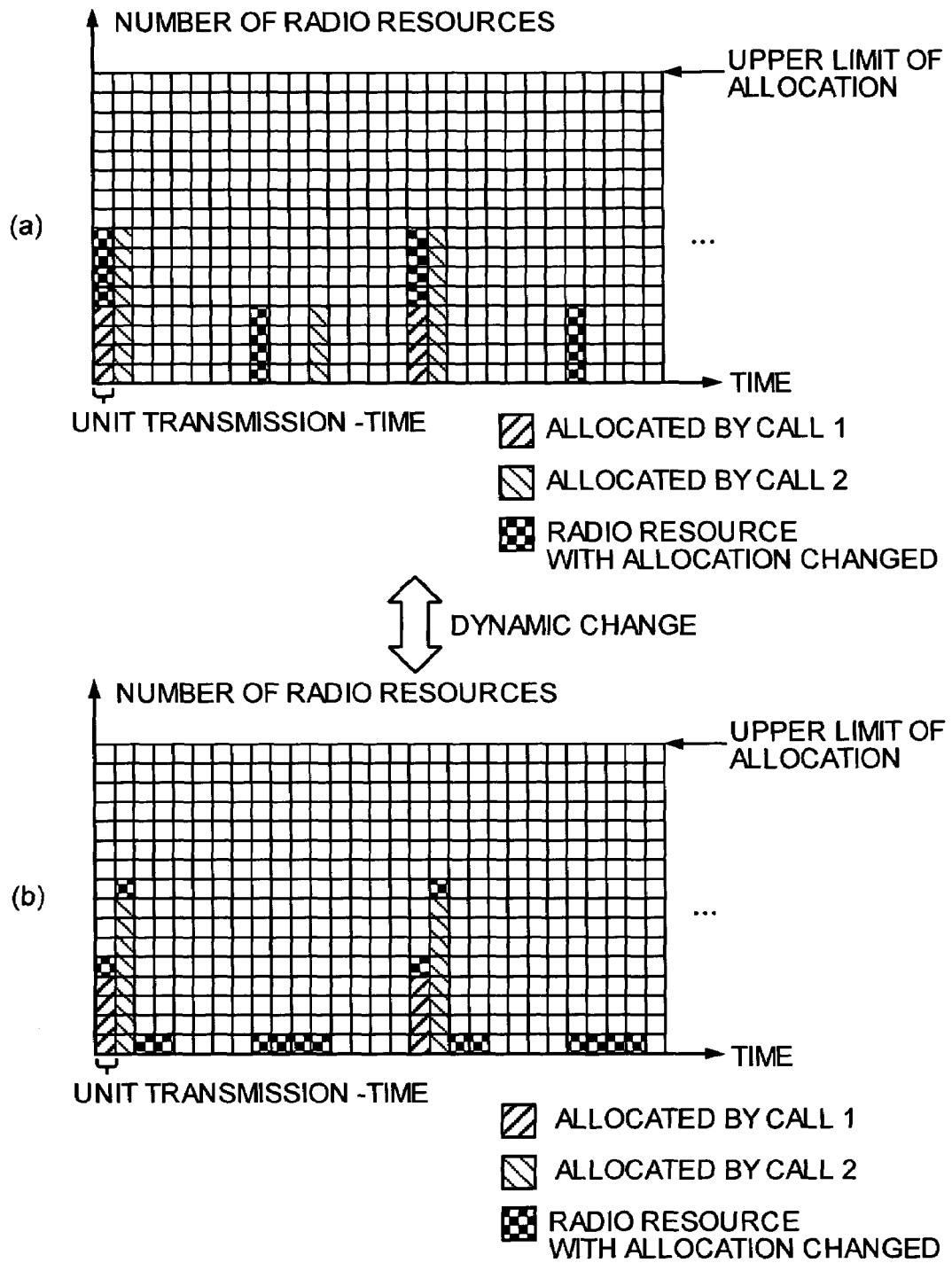
FIGS. 10(a) and 10(b) are graphs of a state of radio resource allocation that change dynamically, which characterize a mobile packet communication system according to a fourth embodiment of the present invention.

FIGS. 10(a) and 10(b) are graphs of radio resource allocation that changes dynamically, which characterize a mobile packet communication system according to a fourth embodiment of the present invention. The number of allocated radio resources is plotted on the ordinate, and time is plotted on the abscissa.

In the first embodiment, if the radio base station 2 determines that the up-link radio transmission of data from the mobile communication terminal 1 has been degraded, the up-link-radio-resource allocating unit 22 stops allocating the radio resources in which radio frames would be transmitted continuously as shown in FIG. 10(a). Instead, the up-link-radio-resource allocating unit 22 allocates the radio resources again so as to transmit radio transmission frames as shown in FIG. 10(b), by dispersing (averaging) along the time axis. The radio base station 2 then notifies a transmission schedule as the result of radio resource allocation, to the mobile communication terminal 1.

When the quality of radio transmission restores, the up-link-radio-resource allocating unit 22 allocates radio frames again so that radio frames can be transmitted continuously as at the initial stage of transmission. This information is notified to the mobile communication terminal 1. According to this information, the mobile communication terminal 1 transmits radio signals in the same way as in the first embodiment.

In the mobile packet communication system according to the present embodiment, the radio base station 2 performs re-scheduling, preparing a schedule in which up-transmission schedule is averaged along the time axis at the time when the quality of radio transmission is degraded. This can reduces a packet loss resulting from the burst errors made when the quality of radio transmission is degraded.

Fifth Embodiment

Figure 11:
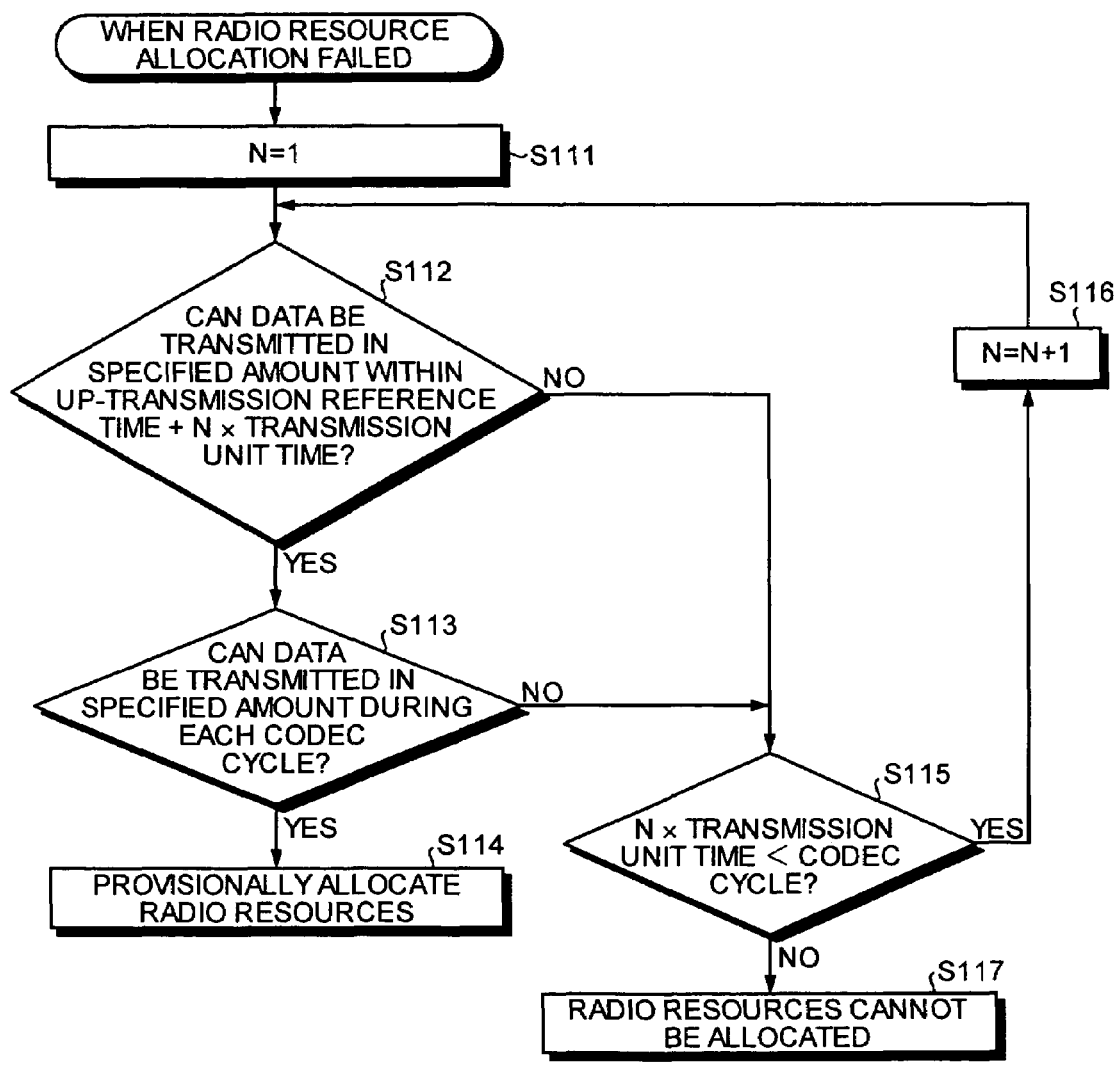
FIG. 11 is a flowchart of an operation when radio resource allocation has failed, which characterizes a mobile packet communication system according to a firth embodiment of the present invention.

FIG. 11 is a flowchart of an operation when radio resource allocation has failed, which characterizes a mobile packet communication system according to a firth embodiment of the present invention.

The present embodiment is characterized by the process that is performed when the radio resource allocation fails. In the first and the fourth embodiments, the up-link-radio-resource allocating unit 22 performs the process shown in FIG. 11, not rejecting the allocation of radio resources (step 107 in FIG. 6), when the radio resource allocation fails.

First, coefficient N is initialized (step 111 in FIG. 11). When a radio resource that can transmit a maximum amount of data per cycle time for each up-transmission reference time+N×unit transmission-time or for each codec-cycle time can be secured, it is considered that radio resources have been successfully provisionally allocated, and a corresponding spreading factor is allocated (steps 112, 113, and 114 in FIG. 11).

If such a radio resource is not secured and if N×unit transmission-time<codec cycle, the coefficient N is set to N+1. The process then returns to step 112 (step 116 in FIG. 11). Otherwise, the up-link-radio-resource allocating unit 22 rejects the allocation of radio resources (step 117 in FIG. 11).

In the present embodiment, if it is determined that a radio resource in which the delay resulting from a radio access can be minimized cannot be allocated, a radio resource in which delay is minimized is allocated from among radio resources that can be allocated in a codec cycle time, and this information is notified to the mobile communication terminal 1.

When any radio resource that is to be allocated initially and that is being used by another call is released, the up-link-radio-resource allocating unit 22 allocates this radio resource in place of one of the radio resources that have been provisionally allocated. The up-link-radio-resource allocating unit 22 then notifies this information to the mobile communication terminal 1.

According to the up-transmission schedule thus updated, the mobile communication terminal 1 controls the transmission of radio signals in the same way as in the first embodiment.

The delay resulting from a radio access can thus be reduced while decreasing the probability of call-reception failure, in the mobile packet communication system according to the present embodiment.

As described in the first to the fifth embodiments, the radio base station 2 allocates up-link radio resources according to the transmission-data basic information so that data can be transmitted continuously in synchronization with the codec cycle of the mobile communication terminal 1 when real-time IP data communication is performed, in the mobile packet communication system according to this invention. The radio base station 2 notifies this information, as an up-transmission schedule, to the mobile communication terminal 1. The mobile communication terminal 1 controls the transmission of radio frames based on the transmission schedule. Therefore, the mobile communication terminal 1 transmits IP data to the radio transmission path in an up-direction at the codec timing of the mobile communication terminal 1. This reduces the delay resulting from a radio access and decreases the transfer delay between the transmission and reception terminals.

INDUSTRIAL APPLICABILITY

As explained above, the mobile packet communication system according to the present invention employs a radio access scheme such as CDMA, and is suitable for use in the transfer of real-time data required to be handled in real-time, such as audio or moving images, in IP packets.

The invention claimed is:

1. A mobile packet communication system comprising:
a radio base station that allocates, when performing a real-time Internet-protocol data communication, up-link radio resources, based on basic information of transmission data, so that the transmission data is transmitted in synchronization with a codec cycle of a mobile communication terminal in a concentrated manner, and notifies a result of allocating the up-link radio resources to the mobile communication terminal as an up-transmission schedule; and
a mobile communication terminal that controls transmission of a radio frame based on the up-transmission schedule.

2. The mobile packet communication system according to claim 1, wherein
the basic information of the transmission data includes codec start-time information determined by the mobile communication terminal, and
the up-transmission schedule created by the radio base station includes a codec start-timing of the mobile communication terminal.

3. The mobile packet communication system according to claim 1, wherein the mobile communication terminal determines a codec start-timing based on the up-transmission schedule.

4. The mobile packet communication system according to claim 1, further comprising:
a radio-base-station control device that adds service-content-dependent communication-parameter information of the transmission data to the basic information of the transmission data.

5. The mobile packet communication system according to claim 1, wherein
when a handover is being performed, a radio base station of a cell or a sector of a destination creates the up-transmission schedule.

6. The mobile packet communication system according to claim 1, wherein
the mobile communication terminal perform the transmission by using radio resources allocated to each codec cycle, and when performing a re-transmission, perform the transmission by using radio resources allocated for best effort.

7. The mobile packet communication system according to claim 1, wherein
the radio base station performs a re-scheduling, when radio quality is degraded, by time-averaging the up-transmission schedule.

8. The mobile packet communication system according to claim 1, wherein
the radio base station allocates a radio resource that minimizes occurrence of a delay.

9. The mobile packet communication system according to claim 1, wherein
when a radio resource with less delay than a radio resource allocated at present is released, the radio base station changes the radio resource to the radio resource with less delay.

* * * * *